(12) United States Patent
Diamond et al.

(10) Patent No.: US 8,893,299 B1
(45) Date of Patent: Nov. 18, 2014

(54) CONTENT KEYS FOR AUTHORIZING ACCESS TO CONTENT

(75) Inventors: Michael B. Diamond, Los Gatos, CA (US); Jonathan B. White, Fort Collins, CO (US)

(73) Assignee: Nvidia Corporation, Santa Clara, CA (US)

( * ) Notice: Subject to any disclaimer, the term of this patent is extended or adjusted under 35 U.S.C. 154(b) by 1328 days.

(21) Appl. No.: 11/112,364

(22) Filed: Apr. 22, 2005

(51) Int. Cl.
*G06F 21/60* (2013.01)
*G06Q 10/00* (2012.01)

(52) U.S. Cl.
USPC .............................................. 726/28; 705/51

(58) Field of Classification Search
USPC .............................................. 726/28; 705/51
See application file for complete search history.

(56) References Cited

U.S. PATENT DOCUMENTS

| | | | |
|---|---|---|---|
| 5,237,616 A | 8/1993 | Abraham et al. | |
| 5,552,897 A | 9/1996 | Mandelbaum et al. | |
| 5,623,546 A | 4/1997 | Hardy et al. | |
| 5,629,980 A | 5/1997 | Stefik et al. | |
| 5,721,829 A | 2/1998 | Dunn et al. | |
| 5,757,911 A | 5/1998 | Shibata | |
| 5,857,020 A | 1/1999 | Peterson, Jr. | |
| 5,861,906 A | 1/1999 | Dunn et al. | |
| 5,880,733 A | 3/1999 | Horvitz et al. | |
| 5,973,680 A | 10/1999 | Ueda | |
| 6,005,636 A | 12/1999 | Westerman | |
| 6,016,348 A | 1/2000 | Blatter et al. | |
| 6,028,585 A | 2/2000 | Ishii et al. | |
| 6,069,647 A * | 5/2000 | Sullivan et al. | 725/29 |
| 6,115,819 A | 9/2000 | Anderson | |
| 6,141,754 A | 10/2000 | Choy | |
| 6,298,445 B1 | 10/2001 | Shostack et al. | |
| 6,314,409 B2 | 11/2001 | Schneck et al. | |
| 6,367,019 B1 | 4/2002 | Ansell et al. | |
| 6,389,538 B1 | 5/2002 | Gruse et al. | |
| 6,389,541 B1 | 5/2002 | Patterson | |
| 6,398,245 B1 | 6/2002 | Gruse et al. | |
| 6,547,829 B1 * | 4/2003 | Meyerzon et al. | 715/234 |
| 6,550,011 B1 | 4/2003 | Sims, III | |
| 6,580,916 B1 | 6/2003 | Weisshaar et al. | |
| 6,597,380 B1 | 7/2003 | Wang et al. | |
| 6,615,192 B1 | 9/2003 | Tagawa et al. | |
| 6,622,148 B1 | 9/2003 | Noble et al. | |
| 6,651,171 B1 | 11/2003 | England et al. | |
| 6,697,948 B1 * | 2/2004 | Rabin et al. | 726/30 |
| 6,708,161 B2 * | 3/2004 | Tenorio et al. | 1/1 |
| 6,742,116 B1 | 5/2004 | Matsui et al. | |

(Continued)

OTHER PUBLICATIONS

BLAZE, A Cryptographic File System for Unix, 1993, ACM, Computer and Communication Security Nov. 1993, pp. 9-16.

(Continued)

*Primary Examiner* — William Powers

(57) ABSTRACT

A method of authorizing access to content, in accordance with one embodiment of the present invention, includes receiving a request to access an instance of content. A key registry server may provide user accounts, which identify an authorized user of the instance of content and a parameter for accessing the instance of content. A determination is then made that accessing the instance of content is within the parameter and authorized for the user and access to the instance of content is allowed. The content may be local to the use system or accessed remotely (e.g., over a network). Also, the registry may be remote to the user system or local or both (e.g., with updates periodically made).

27 Claims, 6 Drawing Sheets

(56) References Cited

U.S. PATENT DOCUMENTS

| | | | |
|---|---|---|---|
| 6,748,537 B2 | 6/2004 | Hughes | |
| 6,772,335 B2 | 8/2004 | Curtis et al. | |
| 6,785,820 B1 | 8/2004 | Muttik et al. | |
| 6,788,800 B1* | 9/2004 | Carr et al. | 382/100 |
| 6,801,999 B1 | 10/2004 | Venkatesan et al. | |
| 6,807,534 B1* | 10/2004 | Erickson | 705/51 |
| 6,824,051 B2* | 11/2004 | Reddy et al. | 235/380 |
| 6,832,319 B1 | 12/2004 | Bell et al. | |
| 6,865,555 B2 | 3/2005 | Novak | |
| 6,891,953 B1 | 5/2005 | DeMello et al. | |
| 6,922,740 B2 | 7/2005 | Kondratiev et al. | |
| 6,948,073 B2* | 9/2005 | England et al. | 726/32 |
| 6,957,343 B2 | 10/2005 | Ripley et al. | |
| 6,980,652 B1 | 12/2005 | Braitberg et al. | |
| 6,990,513 B2 | 1/2006 | Belfiore et al. | |
| 7,003,675 B2 | 2/2006 | Benaloh | |
| 7,010,808 B1 | 3/2006 | Leung et al. | |
| 7,020,688 B2 | 3/2006 | Sykes, Jr. | |
| 7,035,827 B2 | 4/2006 | Ezaki | |
| 7,036,020 B2 | 4/2006 | Thibadeau | |
| 7,047,411 B1 | 5/2006 | DeMello et al. | |
| 7,065,216 B1 | 6/2006 | Benaloh et al. | |
| 7,065,506 B1* | 6/2006 | Phillipo et al. | 705/58 |
| 7,065,651 B2 | 6/2006 | Evans | |
| 7,069,449 B2 | 6/2006 | Weaver, III et al. | |
| 7,073,071 B1 | 7/2006 | Ellison et al. | |
| 7,093,298 B2* | 8/2006 | Rodriquez et al. | 726/28 |
| 7,095,853 B2 | 8/2006 | Morishita | |
| 7,107,462 B2 | 9/2006 | Fransdonk | |
| 7,111,169 B2 | 9/2006 | Ripley et al. | |
| 7,120,250 B2 | 10/2006 | Candelore | |
| 7,120,868 B2 | 10/2006 | Salesin et al. | |
| 7,131,144 B2* | 10/2006 | Rabin et al. | 726/30 |
| 7,139,811 B2 | 11/2006 | Lev Ran et al. | |
| 7,145,492 B2 | 12/2006 | Hirano et al. | |
| 7,150,031 B1 | 12/2006 | Rodriguez et al. | |
| 7,152,047 B1 | 12/2006 | Nagel | |
| 7,155,733 B2 | 12/2006 | Rodriguez et al. | |
| 7,159,120 B2 | 1/2007 | Muratov et al. | |
| 7,181,016 B2 | 2/2007 | Cross et al. | |
| 7,191,153 B1* | 3/2007 | Braitberg et al. | 705/51 |
| 7,197,648 B2 | 3/2007 | Evans | |
| 7,200,593 B2* | 4/2007 | Shimomura et al. | 1/1 |
| 7,225,333 B2* | 5/2007 | Peinado et al. | 713/164 |
| 7,225,340 B2 | 5/2007 | Asahi et al. | |
| 7,228,427 B2* | 6/2007 | Fransdonk | 713/176 |
| 7,242,771 B2 | 7/2007 | Shiragami et al. | |
| 7,299,209 B2 | 11/2007 | Collier | |
| 7,340,056 B2 | 3/2008 | Morcel | |
| 7,353,543 B2 | 4/2008 | Ohmori et al. | |
| 7,370,205 B2 | 5/2008 | Ogino | |
| 7,370,364 B2* | 5/2008 | Dobbins et al. | 726/28 |
| 7,376,624 B2 | 5/2008 | Cochran et al. | |
| 7,383,205 B1* | 6/2008 | Peinado et al. | 705/26 |
| 7,395,333 B1 | 7/2008 | Saulpaugh et al. | |
| 7,395,438 B2 | 7/2008 | Parks et al. | |
| 7,421,128 B2 | 9/2008 | Venkatesan et al. | |
| 7,536,386 B2 | 5/2009 | Samji et al. | |
| 7,543,160 B2 | 6/2009 | Adams et al. | |
| 7,549,044 B2 | 6/2009 | Lee et al. | |
| 7,606,818 B2 | 10/2009 | Bachmann et al. | |
| 7,606,918 B2 | 10/2009 | Holzman et al. | |
| 7,607,024 B2 | 10/2009 | Staring et al. | |
| 7,644,446 B2 | 1/2010 | Strom et al. | |
| 7,689,510 B2* | 3/2010 | Lamkin et al. | 705/51 |
| 7,716,487 B2 | 5/2010 | Venkatesan et al. | |
| 7,933,409 B2 | 4/2011 | Yamamoto et al. | |
| 8,055,910 B2 | 11/2011 | Kocher et al. | |
| 8,359,332 B1 | 1/2013 | Diamond et al. | |
| 8,402,283 B1 | 3/2013 | Diamond et al. | |
| 2001/0020274 A1 | 9/2001 | Shambroom | |
| 2001/0021926 A1 | 9/2001 | Schneck et al. | |
| 2002/0002468 A1 | 1/2002 | Spagna et al. | |
| 2002/0012432 A1 | 1/2002 | England et al. | |
| 2002/0077986 A1* | 6/2002 | Kobata et al. | 705/52 |
| 2002/0077992 A1 | 6/2002 | Tobin | |
| 2002/0099663 A1* | 7/2002 | Yoshino et al. | 705/65 |
| 2002/0186844 A1* | 12/2002 | Levy et al. | 380/231 |
| 2003/0016842 A1 | 1/2003 | Patton et al. | |
| 2003/0061477 A1 | 3/2003 | Kahn et al. | |
| 2003/0070169 A1* | 4/2003 | Beyers et al. | 725/51 |
| 2003/0097655 A1 | 5/2003 | Novak | |
| 2003/0108199 A1 | 6/2003 | Pinder et al. | |
| 2003/0140228 A1 | 7/2003 | Binder | |
| 2003/0149989 A1* | 8/2003 | Hunter et al. | 725/89 |
| 2003/0152364 A1 | 8/2003 | Wajs | |
| 2003/0161473 A1 | 8/2003 | Fransdonk | |
| 2003/0164856 A1 | 9/2003 | Prager et al. | |
| 2003/0177093 A1 | 9/2003 | Hirano et al. | |
| 2003/0215091 A1 | 11/2003 | Kambayashi et al. | |
| 2003/0225796 A1 | 12/2003 | Matsubara | |
| 2003/0229845 A1 | 12/2003 | Salesin et al. | |
| 2004/0012573 A1 | 1/2004 | Morrison et al. | |
| 2004/0015426 A1 | 1/2004 | Tadayon et al. | |
| 2004/0049395 A1* | 3/2004 | Gaya | 705/1 |
| 2004/0083366 A1 | 4/2004 | Nachenberg et al. | |
| 2004/0133794 A1 | 7/2004 | Kocher et al. | |
| 2004/0133803 A1 | 7/2004 | Rabin et al. | |
| 2004/0139396 A1 | 7/2004 | Gelernter et al. | |
| 2004/0148523 A1 | 7/2004 | Lambert | |
| 2004/0193902 A1 | 9/2004 | Vogler et al. | |
| 2005/0008130 A1 | 1/2005 | Wakamatsu | |
| 2005/0025312 A1* | 2/2005 | Rijkaert et al. | 380/37 |
| 2005/0058291 A1 | 3/2005 | Candelore | |
| 2005/0086478 A1 | 4/2005 | Peinado et al. | |
| 2005/0091511 A1 | 4/2005 | Nave et al. | |
| 2005/0111663 A1 | 5/2005 | Lotspiech et al. | |
| 2005/0119967 A1 | 6/2005 | Ishiguro et al. | |
| 2005/0132179 A1 | 6/2005 | Glaum et al. | |
| 2005/0289076 A1 | 12/2005 | Lambert | |
| 2006/0005257 A1 | 1/2006 | Tohru et al. | |
| 2006/0064605 A1 | 3/2006 | Giobbi | |
| 2006/0149567 A1 | 7/2006 | Muller et al. | |
| 2006/0190621 A1 | 8/2006 | Kamperman et al. | |
| 2006/0224902 A1 | 10/2006 | Bolt | |
| 2007/0033419 A1 | 2/2007 | Kocher et al. | |
| 2007/0192111 A1 | 8/2007 | Chasen | |
| 2007/0208992 A1 | 9/2007 | Koren | |
| 2008/0148063 A1 | 6/2008 | Hanko et al. | |
| 2008/0178081 A1 | 7/2008 | Reshef et al. | |

OTHER PUBLICATIONS

CyberLink PowerCinema Linux Featuring Instant-On Capability Enables Digital Home Entertainment for CE and PC; Press Release on Oct. 26, 2004; http://www.cyberlink.com/eng/press_room/view_747.html.

Felton, E. W. 2003. A Skeptical View of DRM and Fair Use. Commun. ACM 46, 4 (Apr. 2003) 56-59.

Licenses for your media files are corrupted, Microsoft, Aug. 21, 2007.

Microsoft Corporation, "A Technical Overview of Windows Media DRM 10 for Device", pp. 1-20, Retrieved from http://download.microsoft.com/download/b/7/a/b7a9aeae-d9f2-435b-a2dc-f3b0909d1d62/A_Technical_Overview_of_WM_DRM_10_for_Devices.doc.

SearchSecurity.com, Content Scrambling System (CSS), May 2000, Retrieved from http://searchsecurity.techtarget.com/definition/Content-Scrambling-System?vgnextfmt=print.

U.S. Appl. No. 10/910,452, filed Aug. 2, 2004; Title: Secure content enabled drive digital rights management system and method.

U.S. Appl. No. 11/013,745, filed Dec. 15, 2004; Title: Content server and method of storing content.

U.S. Appl. No. 11/202,545, filed Aug. 11, 2005; Title: Method and System for Accessing Content on Demand.

U.S. Appl. No. 11/014,001, filed Dec. 15, 2004; Title: Content Server and Method of Providing Content Therefrom.

U.S. Appl. No. 11/193,051, filed Jul. 29, 2005; Title: User Interface for Presentation of Content.

(56) References Cited

OTHER PUBLICATIONS

U.S. Appl. No. 11/202,844, filed Aug. 11, 2005; Title: Method and System for Registering and Activating Content.

Secure Video Processor Challenge—Response Protocol Top-Level Description, SVPLA, Apr. 15, 2004, 8 pages.
SVP Open Content Protection System Technical Overview, SVPLA, Jan. 3, 2005, 51 pages.

* cited by examiner

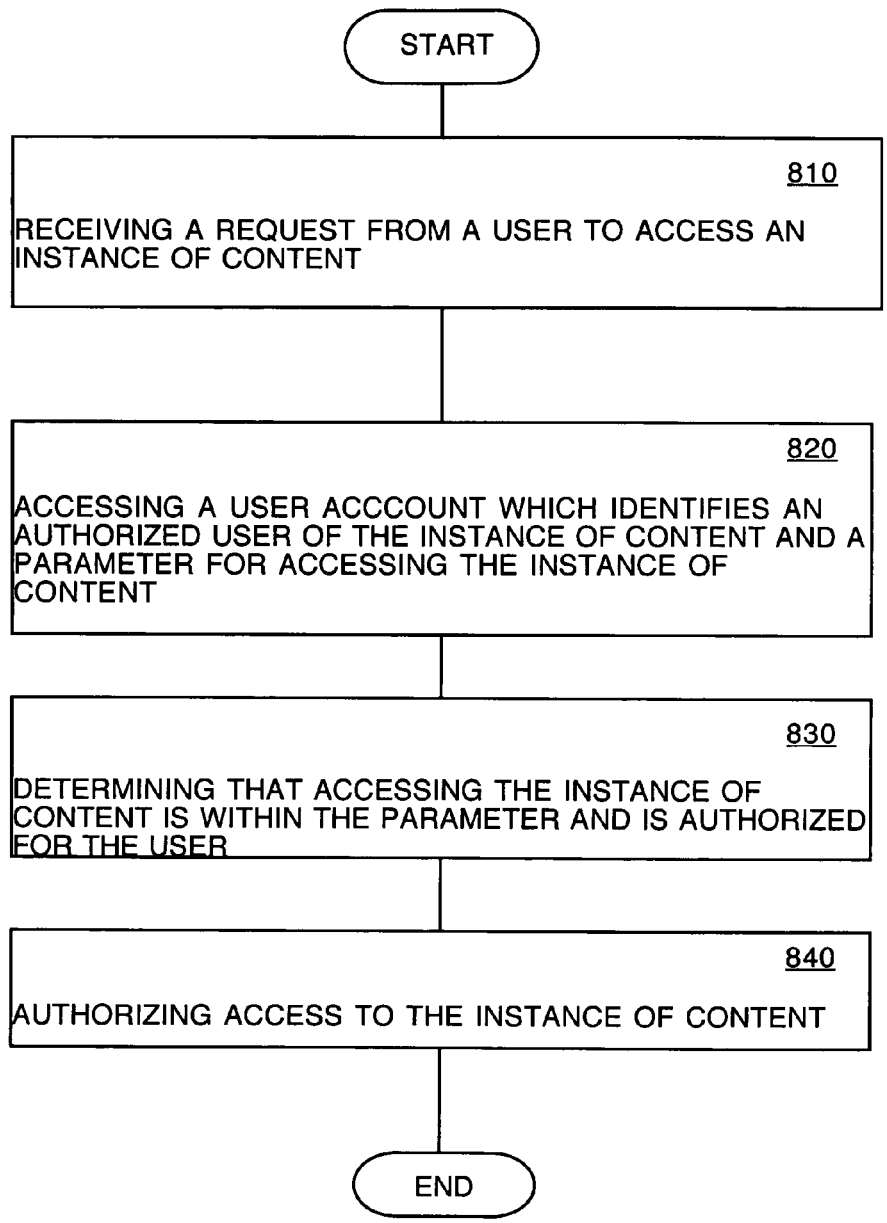

US 8,893,299 B1

CONTENT KEYS FOR AUTHORIZING ACCESS TO CONTENT

RELATED APPLICATIONS

The present invention claims benefit and priority to the U.S. patent application Ser. No. 11/013,745 filed Dec. 15, 2004, titled "Content Server and method of Storing Content," by Michael Diamond and Jonathan White, assigned to the assignee of the present invention, and which is hereby incorporated by reference in its entirety herein.

BACKGROUND OF THE INVENTION

Electronic systems today present any of a vast array of content to a user. The convenience of having content more readily accessible typically results in content being accessed more often and also results in viewers acquiring ever-increasing amounts of content. Accordingly, content servers have advantageously been utilized to make content more readily accessible to all kinds of users.

A content server typically stores content onto a mass storage device and presents the content stored thereon. Referring to FIG. 1, a flow diagram of steps of a method of storing content on a content server according to the conventional art is shown. As depicted in FIG. 1, the method of storing content begins with receiving content, at 110. For example, a user may insert a DVD containing a movie or a CD containing music in the CD/DVD drive of the content server. The content may be received in a protected format, such as content scrambling system (CSS) encryption or the like. If the received content is encoded in a protected format, the protection may be removed from the content, at 120. For example, a disk key contained on the DVD or CD may be used to decrypt the CSS encoded music or movie. The unprotected content is then stored on a mass storage device, such as a hard disk drive, at 130.

Referring now to FIG. 2, a flow diagram of steps of a method of presenting the content stored on the content server according to the conventional art is shown. As depicted in FIG. 2, the method of presenting content begins with receiving a request for a particular item of content, at 210. At 220, the requested content is presented on an appropriate output device to the user.

Traditional systems for communicating and storing content often make copying of proprietary content relatively easy. For example, it is not uncommon for a user of the above-described content server to rent movies and/or music on DVDs and/or CDs and load them onto their system. The user may then return the DVDs or CDs, and yet continue to illegally watch the movies and/or listen to the music after the rental period has expired. Similarly, a user may borrow movies and/or music from others and load them onto their content server. The user may then return the DVD or CD to the person that they borrowed it from, and yet continue to illegally watch the movies and/or listen to the music thereafter. Accordingly, conventional content servers readily enable rent-and-rip, borrow-and-rip and the like.

However, creators and/or distributors of proprietary content (e.g., movies, music, etc.) have an economic interest in the content and desire to restrict the copying and/or distribution of the proprietary content to individuals that have purchased or rented the content in accordance with the nature of the user's ownership. Thus, content servers according to the conventional art are problematic in that the interests of the creators and/or distributors of proprietary content are not protected.

In addition, if the mass storage device should become damaged or stolen or otherwise inaccessible, the user may lose the content stored thereon. If the user does not have a copy of the content, then that content will need to be re-purchased in order for the user to access it once more.

SUMMARY OF THE INVENTION

Accordingly, embodiments of the present invention are directed toward a system and method of authorizing user access to content and recording that user authorization which may be content-specific. In one embodiment, a key or code is assigned to a user which indicates the user's authority to access the content. This key may be stored in a safe repository. In one embodiment, a method of authorizing access to content includes receiving a request to access an instance of content. A user account, which identifies an authorized user of the instance of content and a parameter for accessing the instance of content are accessed. A determination is then made that accessing the instance of content is within the parameter and access to the instance of content is authorized.

In embodiments of the present invention, each instance of content is assigned a unique serial number that identifies the content. A content key can also indicate the type of content (e.g., rental, purchased, etc.) via a parameter. The content key and serial number are used to identify an instance of content and an authorized user or use type of that content. A separate database may correlate user accounts with the above data. Therefore, if a user has the proper serial number and content key in his/her user account, then they have the prescribed access to the instance of content and this access can be obtained locally or remotely through any networked device (e.g., globally). Importantly, loss of the instance of content does not require re-purchase of the content because ownership thereof is dictated by the key data stored in the user account.

In another embodiment, a system for authorizing access to content comprises a communication channel for receiving an access request comprising a unique identification of an instance of content. A mass storage device coupled with the communication channel may be used to store a user account. A processing unit coupled with the communication channel and with the mass storage device accesses the user account in response to receiving the request. The processing unit further may compare the unique identification with a corresponding unique identification or key stored in the user account. The processing unit may also compare the current time and date with an access parameter stored in the user account and generate a message via the communication channel authorizing access to the instance of media based on the contents of the user account.

Embodiments of the present invention advantageously decouple user access rights from the media conveying an instance of content. In so doing, embodiments of the present invention facilitate the user's accessing the content from a variety of locations without necessitating the purchase of separate copies of the content. Embodiments of the present invention also facilitate the user recovering lost, stolen, or damaged content without the necessity of buying the content again. Embodiments also facilitate the transfer and/or changing of access rights to an instance of content. Accordingly, embodiments of the present invention advantageously facilitate convenient and secure distribution of proprietary content by evidencing ownership of an instance o content by a key stored in a user account or registry.

BRIEF DESCRIPTION OF THE DRAWINGS

Embodiments of the present invention are illustrated by way of example and not by way of limitation, in the figures of the accompanying drawings and in which like reference numerals refer to similar elements and in which:

FIG. 8 is a flowchart of a computer implemented method for accessing content in accordance with embodiments of the present invention.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
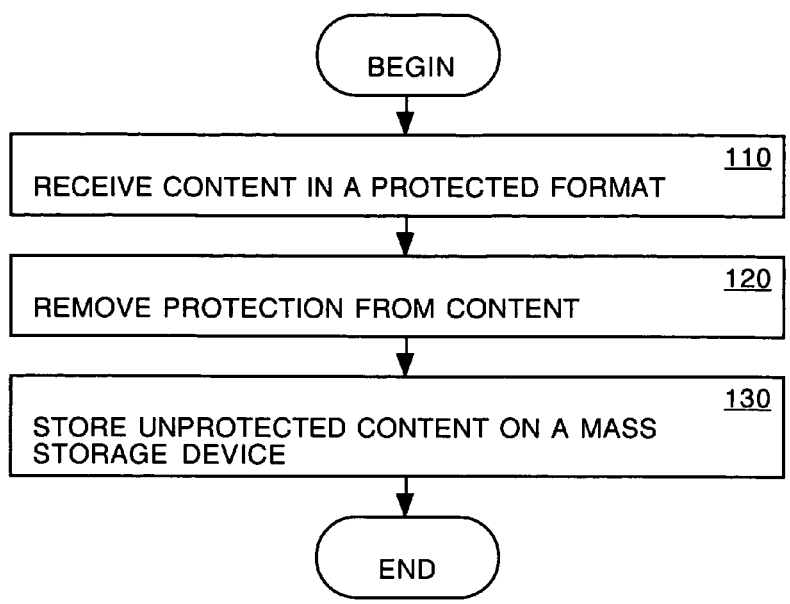
FIG. 1 shows a flow diagram of steps of a method of storing content on a content server according to the conventional art.
Figure 2:
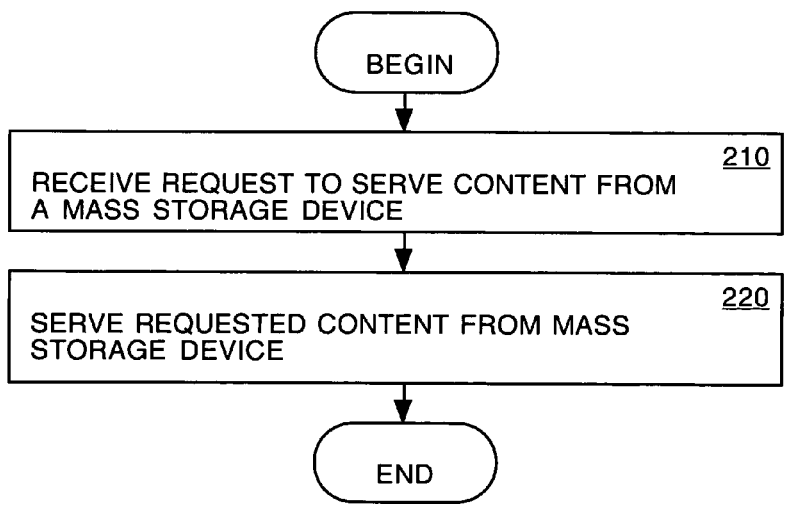
FIG. 2 shows a flow diagram of steps of a method of presenting content stored on the content server according to the conventional art.
Figure 3:
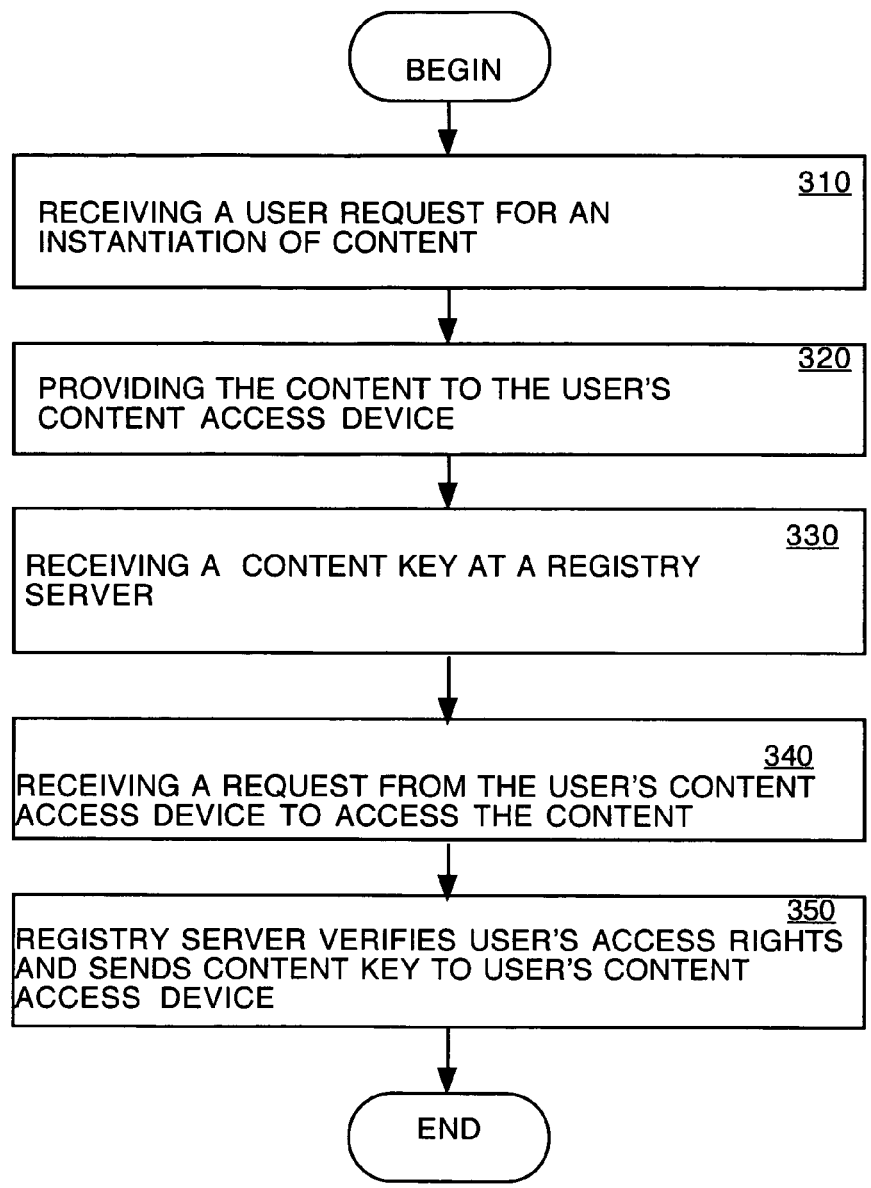
FIG. 3 shows a flow diagram of steps of a computer implemented method of storing content, in accordance with one embodiment of the present invention.

FIG. 3 is a flowchart of a process for storing content in accordance with embodiments of the present invention. In step 310 of FIG. 3, a user request is received for an instantiation of content. In embodiments of the present invention, the user request can be generated by a content access device, or another device which is communicatively coupled with the content provider (e.g., via the Internet). As an example, a user's set-top box (e.g., a personal video recorder (PVR), or digital video recorder (PVR)), or a portable content access device may be used to generate a request to a content provider for an instance of content such as a movie, television programming, etc. It is noted that embodiments of the present invention are not limited to these types of content alone. Instead, content as used hereinafter, may include any digital information or content such as text, graphics, audio, sound, images, video, movies, music, applications, games and/or the like. The user may also indicate a requested use type (e.g., temporarily rent the content, own the content, etc.).

It is appreciated that a user interface (e.g., graphical user interface) may be provided to readily enable a user to identify and order an instance of content and related use type in accordance with embodiments of the present invention. Therefore, in embodiments of the present invention, ordering an instance of content may comprise purchasing or renting content from the content provider using the interface. The interface may also enable purchase of rental content that has previously been ordered, or for an extending the rental period thereof. The interface may also enable purchase or rental of content that has been preloaded, but is currently inaccessible, onto a mass storage device which is coupled with the user's content access device. The user interface may also enable purchase of credits to be applied to accessing any one or more items of content as and when the user chooses. A transaction system may also be implemented by the user interface to enable the above-described transactions.

In step 320 of FIG. 3, the content provider may provide content which is stored on the user's content access device. In embodiments of the present invention, the content may be received by any well-known signaling method such as electromagnetic, electrical, optical or the like (e.g., electronic transmission). Receiving content utilizing electronic transmission may enable content-on-demand, receiving new releases via a background download, and the like, without the user having to acquire the physical medium first. In embodiments of the present invention, the content may be stored on a mass storage device (e.g., hard disk drive) of the user's content access device or which is coupled with the user's content access device (e.g., a networked mass storage device) or to a location remote to the user. If the content is in a protected format, it is stored in its protected format. In one implementation, a received CSS encrypted content is copied to the mass storage device of the user's content access device. Accordingly, it is appreciated that the particular protection mechanism of the proprietary content is maintained.

It is appreciated that the mass storage device may also contain preloaded encrypted content. One or more encrypted content keys (e.g., 523 of FIG. 5) related to the preloaded content may also be hidden on the mass storage device. Alternatively, the content keys may be purchased and "downloaded" later from a remote "key server" or registry using some kind of two-way network, such as Internet, satellite with a backchannel (e.g., DirecTV connected to a phone line so that one may order on-demand movies through the regular phone network), cellular or the like.

In embodiments of the present invention one or more of the content keys is embedded within the content that is provided to the user (e.g., a watermark). Furthermore, one or more of the embedded content keys uniquely identifies that particular instance of content. It is appreciated that one or more content keys may contain a field that identifies the type of content, such as purchased content, rented content, preloaded content, offered content (e.g. for rent or for sale) or the like. In embodiments of the present invention, one or more of the content keys may include access parameters associated with that instance of content. For example, rented content may be accessed an unlimited number of times within a designated time period (e.g., three days), or the access of the content is limited to a set number of times (e.g., access to the content is permitted only five times). The identifier of the type of content contained in a key may be utilized for such functions as purchasing the rented content, extending the rental period of rented content, renting or purchasing preloaded content, renting or purchasing offered content, and/or the like.

Furthermore, it is appreciated that the protection scheme of the original form of the content is substantially preserved. Accordingly, the stored content may be thought of as a virtual copy of the content. The one or more keys needed for playing the content are not accessible. Therefore, the process of storing content on a server, in accordance with the present invention, advantageously prevents extraction of the content back off the mass storage device, because the content remains encrypted and it is useless without the hidden encrypted keys. Thus, a user cannot effectively get such content off the server (e.g., play the content) without the decryption keys.

In step 330 of FIG. 3, a registry server receives a content key associated with the instance of content. This may be triggered by a communication from the content provider. In embodiments of the present invention, a registry server (e.g., authentication server 730 of FIG. 7) stores content keys (e.g., 523) in user accounts. Each instance of content to which the user has access rights is identified by a unique content key stored in the user account. The content key thus associates a user with an instance of content and/or an access parameter(s) (e.g., use type) which define that user's access rights to that instance of content. The content may be purchased or rented by the user, or user created content which is registered with the registry server. In embodiments of the present invention, the registry server may be maintained by the content provider, or may be a third party which provides a content key registry service. In embodiments of the present invention, the registry server may also facilitate a user's ordering of content from the content provider.

In embodiments of the present invention, the user account information may be used to verify a user's access rights to an instance of content for which they have paid. Thus, if the mass storage device upon which the content is stored suffers a catastrophic failure or loss, the user can verify their access rights to the content through the registry server. Upon doing so, the user can again access the content without having to purchase a new copy. It is appreciated that the contents of a user account can be downloaded to the user's content access device periodically (e.g., 711 of FIG. 7).

In step 340 of FIG. 3, the registry server may receive a request from the user's content access device to access the encrypted content stored thereon. It is noted that for purposes of the present invention, the term "access" means that the user is attempting to use, display, and/or play the content as opposed to, for example, merely storing the content. When the user attempts to access the content loaded onto, for example, their mass storage device, a request is generated by the user's content access device to verify that the user is permitted to access the instance of content. For example, a request which conveys the unique identification of the instance of content being accessed may be sent to the registry server. As discussed above, in embodiments of the present invention, the protection scheme of the original form of the content is substantially preserved. Accordingly, the stored content may be thought of as a virtual copy of the content. Thus, one or more decryption keys needed for decrypting the content are not accessible. In embodiments of the present invention, access to the decryption keys is blocked unless the user's content access device receives a content key which verifies that the user is permitted to access the content. This advantageously prevents extraction of the content back off the mass storage device, because the content remains encrypted and it is inaccessible without access to the hidden encryption keys. Thus, a user cannot effectively get such content off of the content access device (e.g., play the content) without the decryption keys.

In step 350 of FIG. 3, the key registry server verifies the user's access rights and sends one or more content keys and/or a validation message to the user's content access device. The one or more content keys associated with that particular instance of content may be encoded in a safeguarded format and stored on the mass storage device, or elsewhere (e.g., in memory or as a register value), on the user's content access device. The keys may be encoded utilizing any well-known encryption algorithm. Alternatively, the key may be stored in a user account that is remote to the receiving system (e.g., on the registry server). In embodiments of the present invention, unless the user's content access device can access a content key which verifies that the user is permitted to access that instance of content, access to the decryption keys for that content is blocked. While the present embodiment specifically teaches blocking access to decryption keys, it is noted that other well known methods may be used to block access to the content in accordance with embodiments of the present invention. In one embodiment, each time the user's content access device is powered up, the device contacts the registry server to receive the most recent set of content keys associated with the user.

Furthermore, in embodiments of the present invention, the content key sent by the registry server may only be valid for a specified time period, even if the content key is for content the user has purchased. As a result, the user's content access device will have to occasionally communicate with the registry server to verify that a valid content key is resident on the user's content access device.

Embodiments of the present invention de-couple user access rights from the media conveying the content. As a result, greater security against unauthorized access to the content can be realized as the content key authorizing access may be stored and/or validated remotely in the registry server. Furthermore, de-coupling the user's access rights from the media allows the user to verify their access rights to the content if the media storing the content is lost, stolen, or somehow becomes unusable to the user.

Figure 4:
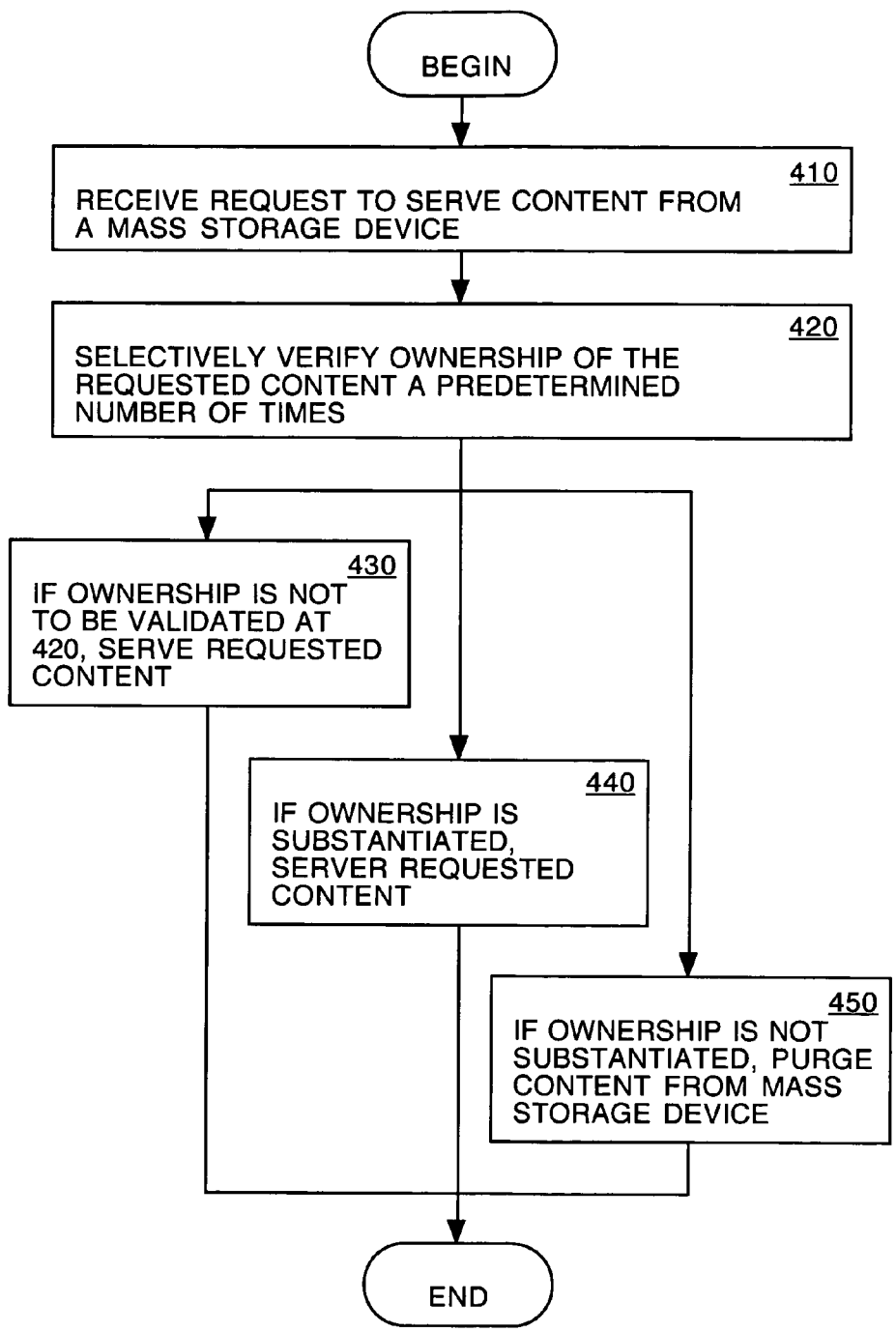
FIG. 4 shows a flow diagram of steps of a computer implemented method of serving content, in accordance with one embodiment of the present invention.

Referring now to FIG. 4, a flowchart of a process 400 of serving content, in accordance with one embodiment of the present invention, is shown that provides selective verification. In embodiments of the present invention, process 400 may be implemented by, for example, using a registry server (e.g., 730 of FIG. 7). As depicted in FIG. 4, process 400 begins with receiving a request to serve one or more particular items of content, at 410. The request may be to play an item of content (e.g., movie, music, video game, etc.) saved on a mass storage device. In one implementation a user interface (e.g., graphical user interface) may be provided to enable a user to select a particular item of content stored on the mass storage device.

It is appreciated that the user interface (UI) may provide a drill-down type menu for selecting content stored on the mass storage device. For example, a first level may present various choices of content types, such as movies on the server, music on the server, television, internet, and/or the like. A second level may present categorical choices of content on the server, such as comedy, drama, actor, director, suggestion and/or the like. A third level may present a grid of thumbnails, wherein each thumbnail corresponds to a particular item of content on the server for a selected category.

It is appreciated that each item of content may be represented by a thumbnail or as a combination of text and a corresponding thumbnail. The thumbnail may be, for example, a still picture of an album cover for music, a still picture of a DVD jacket, a still picture of a scene from the movie, or the like. In addition, the thumbnail may be a video preview of a movie or may be a still picture of a scene and when the user causes a pointer to pass over the thumbnail or highlights the thumbnail a video preview may play. The thumbnail for use in the UI may be contained as part of the content when it is loaded on the system.

It is appreciated that a particular menu level, composed of a grid of thumbnails, may be dynamically scaled as a function of the view size of the display screen. The grid of thumbnails for a menu level may constitute a virtual display. Only a portion of the virtual display may actually be displayed on the physical screen. The virtual display may then be navigated such that a given portion is displayed on the physical screen.

It is appreciated that the system, via the user interface, may collect a history of content viewed by a user and suggest content based upon the past viewing history. The history may be collected on a per viewer basis. The suggestions may be present as a function of a hierarchy based upon the current viewers and/or the relative ranking of their individual and/or collective past viewing history.

In addition to checking user authorization of an instance of content before access is given to the user, at 420, ownership of the requested particular content may be selectively verified by a registry server. The ownership of the content may be verified by requesting that the user provide evidence of ownership. In one implementation, verification of ownership may be implemented by checking a registration database (e.g., 740 of FIG. 7) as discussed earlier. The registration database may enable association of an instance of content with a given user or device upon proof-of-purchase, such as a unique serial number associated with that particular instance of content when it has been purchased or rented. The registration database may thus provide authentication that the content as identified by an identification unique to that content has been registered for access by a particular user and/or that user's content access device. It is noted that steps 410 and 420 above are described in greater detail below with reference to FIG. 8.

In this example, ownership may be selectively verified a predetermined number of times. In one implementation, each verification request may be made after a fixed period of time (e.g., days, weeks, months, etc.). In another implementation, each verification request may be made after a random period of time. In another implementation, each verification request may be made after a random number of requests for the particular content. In one implementation, the predetermined number of times may be a fixed number of times for each item of content. In another implementation, the predetermined number of times may be a random number of times for each item of content. In another embodiment, a request to access the content is generated each time the content is accessed, One or more of the above implementations may also be combined.

It is appreciated that one or more content keys may contain a field that identifies the type of content, such as purchased content, rented content, preloaded content, offered content (e.g. for rent or for sale) or the like. The identifier of the type of content contained in a key may be utilized to adjust the selective verification of ownership in accordance with the nature of the content type and/or a parameter for accessing the content.

It is appreciated that a registry, such as an internet based registration service, may be utilized to enable activation of content on one or more devices or transfer of content from one user to another (e.g., a user sells his/her access rights to another user). The registry (e.g., database) may associate instances of a particular item of content (e.g., a unique identification of that instance of content) with a particular owner (e.g., user ID, device ID, etc.). For example, a user may have the content on a plurality of systems, such as a home content server system and a vacation home content server system, a mobile content access device, etc. In such case, the registry may be utilized to enable access to the content on only one system at a time by limiting association of the content key with a select number of device identifiers. In another implementation, the registry enables an owner of a particular instance of content to sell it to another person. The transaction may be based upon a unique serialized key stored on the mass storage device and contained in the registry. In yet another implementation, the registry may enable the content to be streamed (e.g., served) to a portable device, such as a phone, laptop computer or the like, at any number of locations across any network (e.g., virtual player).

At 430, if ownership of the content is not to be validated at 420 for the given request, the requested content may be decrypted and presented. At 440, if ownership of the particular content is substantiated, the requested content may be decrypted and presented. At 450, if ownership of the particular content is not substantiated, the request may be denied. Furthermore, if ownership of the particular content is not substantiated, the requested content may also be purged or otherwise rendered unselectable, an error message may be generated, a transaction system may be invoked to debit a user's account, or the like.

Typically, process 420 may be repeated for each of a predetermined number of times with regard to requests for each given item of content. In one embodiment, if ownership of the particular content is substantiated each of a predetermined number of times, the ownership may be considered corroborated. If ownership of the particular content is corroborated, ownership may not need to be validated again. Thereafter, a request for content, wherein ownership has been corroborated, may be served to the user, at 430, without further validation processes.

In an exemplary implementation, a first verification request may be made a random one of a number of plays after a first fixed period of time. The first fixed period of time may be measured from when the particular content was loaded onto the system. The first fixed period of time may be selected based upon a criterion such as the typical rental period (e.g., 10 days). A second verification request may be made a random one of number of plays after the expiration of a second fixed period. The second fixed period of time (e.g., 30 days) may be greater than the first fixed period of time, to reduce the inconvenience factor to the user. A third and final verification request may be made a random one of a number of plays after the expiration of a third fixed period. The third fixed period of time (e.g., 100 days) may be greater than the second fixed period of time, to further reduce the inconvenience factor to the user. Thereafter, the system will have been "taught" that ownership has been corroborated and subsequent requests for the same content can be served without verifying ownership.

Accordingly, process 400 balances convenience for the user with the economic interests of the content creator and/or distributor. For example, if the content is rented for a ten day period, the user may load the movie on the system and view it any number of time during the ten day period of the rental in accordance with an access parameter which may included into the content key associated with that instance of content. After the rental period expires, the access parameter will indicate that further accessing of the content is not authorized. Thus, if the user attempts to continue watching the movie, the system will not be able to access the decryption keys needed for displaying the content. A reminder may be displayed that the rental period for that instance of content has expired to remind the user to extend the rental period, or to purchase that instance of content. If the content has been purchased by the user and loaded on the system, the content key will indicate that the user has unlimited access to that instance of content. In one embodiment, if ownership is not substantiated the user's content access device may purge the content.

Accordingly, embodiments of the present invention advantageously balance user convenience and the economic interests of content creators and/or distributors. Ownership of requested content can be selectively verified before the requested content is presented. If ownership or access rights are not substantiated, the content may be purged from the system. Furthermore, if ownership is successfully substantiated a number of times, the system may be taught that the content is owned and verification need not be performed again.

Figure 5:
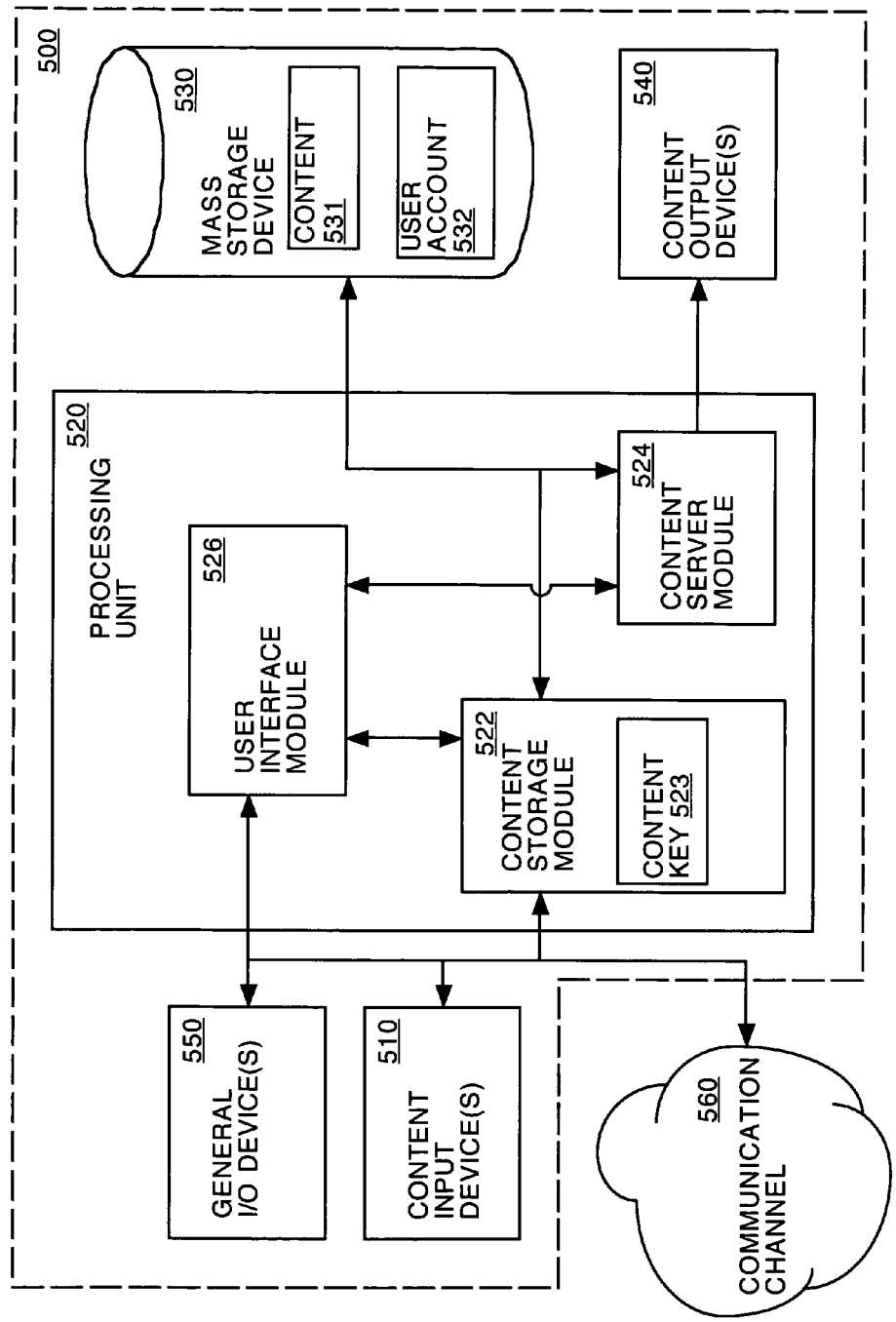
FIG. 5 shows a block diagram of a system for storing and serving content, in accordance with one embodiment of the present invention.

Referring now to FIG. 5, a block diagram of a system for storing and serving content, in accordance with embodiments of the present invention, is shown. The system 500 may be implemented on a personal computer, a server, a client, a laptop computer, a media center PC, a personal entertainment center, a set top box, a game console, a personal digital assistant, a cellular telephone, a portable wireless appliance, and/or the like. As depicted in FIG. 5, the system includes one or more content input devices 510, a processing unit 520, a mass storage device 530 (e.g., computer readable medium) and one or more content output devices 540. The system 500 may also include one or more general input/output devices 550. It is appreciated that the content input devices 510 and content output devices 540 may be particular units of the general input/output devices 550. The system 500 may also be communicatively coupled to a communication channel 560, for receiving content utilizing any well-known signaling method.

The processing unit 520 may be communicatively coupled to the general I/O device 550, the content input device 510, the mass storage device 530 and the content output device 540. The content input device 510 may be a compact disk (CD) drive, a digital versatile disk (DVD) drive, a memory card reader and/or the like. The content output device 540 may be a display, monitor, television, projector, speaker, headphone, brail reader and/or the like. The mass storage device 530 may be a hard disk drive (HDD), portable storage device/card (e.g., USB drive and other flash-based memory) or the like. The general I/O devices 550 may be a keyboard, pointing device, monitor, speaker, brail reader and/or the like.

The processing unit 520 provides one or more function modules by operating on instructions (e.g., computer executable code) and information (e.g., data) stored in memory (e.g., computer-readable medium). The function modules may include a content storage module 522, a content server module 524 and a user interface module 526. The content storage module 522 may receive content via the content input device 510 or the communication channel 560 (e.g., network). The content may be received in a protected or unprotected format. The user interface module 526 may enable a user to cause the content storage module 522 to load the content onto the mass storage device 530.

If the content is received in a protected format, the content storage module 522 may also receive one or more keys. The keys may include a first key unique to the content and a second key may be dynamically generated by the content input device 510, or by another computer system 500. The content storage module 522 may store the content in its protected format and the one or more keys in a safeguarded format on the mass storage device 530. Alternatively, content storage module 522 may store the keys (e.g., content key 523) in a hidden location of system 500 such as a cache memory, etc.

The content server module 524 may receive a request for a particular item of content stored on the mass storage device 530 (e.g., content 531) via the user interface module 526. The content server module 524 may selectively verify ownership of the requested content utilizing the one or more keys (e.g., content key 523) corresponding to the requested content, which are stored on the mass storage device 530 (e.g., in user account 532), or cached locally. If ownership of the content is validated, the content server module 524 outputs the requested content on the content output device 540 or via communication channel 560 utilizing the one or more keys corresponding to the content, which are stored on the mass storage device 530. If ownership of the content is not validated, the content server module 524 may purge the particular content from the mass storage device, or simply block access to the requested content 531.

Figure 6:
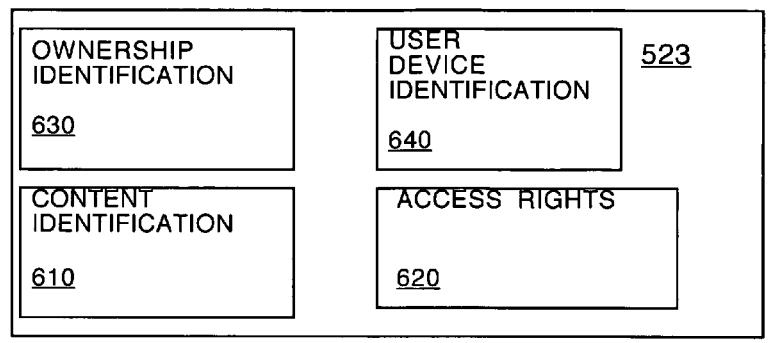
FIG. 6 is a block diagram of an exemplary content key in accordance with embodiments of the present invention.

FIG. 6 is a block diagram of an exemplary content key 523 in accordance with embodiments of the present invention. In embodiments of the present invention, each instance of content is associated with a content key 523 and is used to identify the instance of content. Optional information in content key 523 may be used to identify the ownership of the instance of content, devices which are permitted to access an instance of content, and/or define access parameters associated with the instance of content. It is noted that for purposes of the present invention, the access parameters of the instance of content may include unlimited access, or restricted access to the instance of content 531. Furthermore, restricted access may be defined by a time period (e.g., unlimited access to content 531 for three days), or by the actual number of times content 531 is accessed (e.g., access is only permitted twice).

Referring now to FIG. 6, content key 523 comprises a content identification field 610 which identifies a particular instance of content 531. Content key 523 further comprises an optional access rights field 620, also called a "use-type" field, for defining access parameters of content 531, an optional ownership identification field 630 which identifies the user, or users to which access rights 620 are assigned, and an optional user device identification field 640 which identifies devices that are permitted to access a particular instance of content.

In embodiments of the present invention, each instance of content created will have a unique content identification field 610 assigned thereto. Thus, if a million copies of a movie are created for distribution, each of those copies or instantiations will be uniquely identified by its respective content identification field 610 when it is created. However, as described above, a content key may be assigned to any instance of digital content such as text, graphics, audio, sound, images, video, movies, music, applications, games and/or the like. In embodiments of the present invention, content identification field 610 may be embedded within content 531 such as by including a watermark into content 531. Furthermore, identification field 610 may be encrypted, scrambled, hidden, or otherwise protected from access by a user. In embodiments of the present invention, when content 531 is purchased, or rented, access rights field 620, ownership identification field 630, and/or user device identification field 640 may also be embedded within content 531 prior to conveying the content to the user.

In embodiments of the present invention, when each instance of content 531 is created, ownership identification field 630 identifies the user who is allowed access thereto. Additionally, when content 531 is bought, sold, or otherwise distributed, the ownership field 630 may be updated to reflect the change in ownership of content 531. This advantageously establishes a chain of custody which can be used to determine whether an instance of content has been stolen or reproduced without permission.

As described above, access rights field 620 describes the parameters under which the user described in ownership identification field 630 may access content 531. The contents of access rights field 620 may also be updated to reflect a change in the access rights of the owner of content 531. For example, if a user is renting content 531 and decides to purchase it, the contents of access rights field 620 may be updated to reflect the change in ownership status. In other words, the access parameter may be changed from, for example, access during a pre-defined time period to unlimited access to content 531. Alternatively, a new instance of content 531 may be created having a new content identification field 610 and which describes the user in ownership identification field 630 and the parameters under which that user can access content 531 in the access rights field 620. Alternatively, if a user decides to sell or transfer ownership rights of content 531, ownership identification field 630 can be updated to assign the access rights of content 531 to the new owner.

In embodiments of the present invention, a user may register a media access device (e.g., system 500) which is permitted to access content 531. In embodiments of the present invention, a media device identification field 640 is used to convey the identification of a device attempting to access content 531, or which is permitted to access the content.

As will be described in detail below, in embodiments of the present invention, content key 523 is used to restrict access to the decryption key used to access an instance of content. For example, the user device may not access the decryption key for the instance of content if there is a discrepancy between the information embedded within the content 531 and the content key 523 which is stored on the user's content access device. This information may include any combination of the data conveyed in content key 531 such as content identification field 610, the access rights field 620, the ownership identification field 630, and/or the user device identification field 640.

Figure 7:
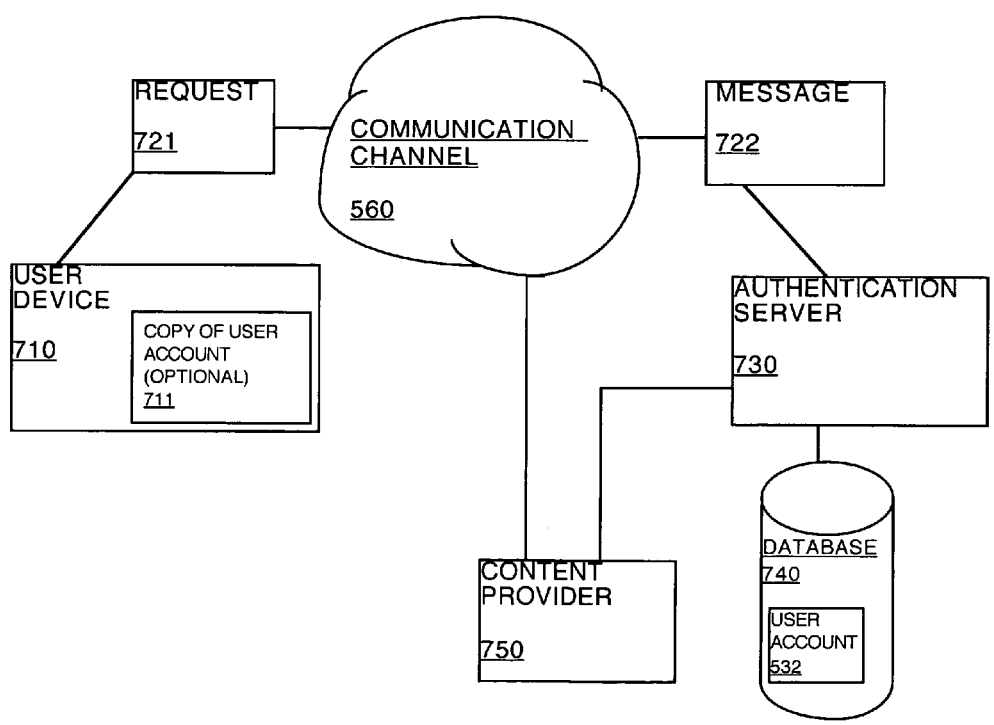
FIG. 7 shows an exemplary system for authorizing access to content in accordance with embodiments of the present invention.

FIG. 7 shows an exemplary system for authorizing access to content in accordance with embodiments of the present invention. In FIG. 7, a user device 710 (e.g., system 500) is communicatively coupled with and authentication server 730 (e.g., a second system 500) and a content provider 750 via communication channel 560. It is noted that in embodiments of the present invention, authentication server 730 and content provider 750 may be the same entity. In the embodiment of FIG. 7, user device 710 is configured as a media access device such as a personal computer, a client, a laptop computer, a media center PC, a personal entertainment center, a set top box, a game console, a personal digital assistant, a cellular telephone, a portable wireless appliance, or the like. Additionally, in the present embodiment, authentication server 730 is configured as an account management system for verifying access rights to content 531.

In embodiments of the present invention, authentication server 730 verifies the access rights to an instance of content as described above with reference to FIG. 4. As described above, in embodiments of the present invention each instance of content (e.g., 531) is assigned a unique identification. When a user purchases, rents, or changes their access rights to an instance of content (e.g., 531), the user and the unique identification of that instance of content are registered with authentication server 730 (e.g., in user account 532). In embodiments of the present invention user account 532 may be stored in a local database (e.g., mass storage device 530 of authentication server 730), or stored in a remotely accessed database 740. A copy of the user account (e.g., 711) may be periodically updated on the user device 710. When the user is registered in user account 532, authentication server 730 verifies that the user is allowed access to content 531. In embodiments of the present invention, content 531 may be provided by authentication server 730 (e.g., from mass storage device 530) upon verification of user access rights. Alternatively, authentication server 730 may verify the access rights of the user to a content provider (e.g., 750) who then provides the content 531. In one embodiment, the content provider generates the validation key, forwards it to the registry 730, and also forwards the content to the user device 710. In embodiments of the present invention, the user may also register media access devices to their personal account which are permitted access to the instance of content 531. Content may also be provided by the content provider to the user device 710 in an encrypted format and this may occur well in advance of the user accessing the content.

In embodiments of the present invention, when a user attempts to access an instance of content 531, access to the decryption keys is blocked until verification of access rights is provided by authentication server 730. For example, until authentication server conveys a content key 523 to user device 710, access to a decryption key for content 531 is blocked. In embodiments of the present invention, the request identifies the instance of content using the unique identification (e.g., content identification field 610) which is embedded within content 531. The request may comprise additional information such as ownership identification field 630 and/or media device identification 640. In another embodiment, access to streaming data comprising content 531 (e.g., from authentication server 730 or content provider 750) is blocked until verification of access rights is provided by authentication server 730.

If the user has previously established access rights to content 531 in user account 532, authentication server 730 compares at least one access parameter for the instance of content 531 with that user. For example, if the user has purchased a copy of content 531, the user may access content 531 without any restriction on time or usage. However, if the user has rented the instance of content 531, the user may be restricted to accessing content 531 for a given time period (e.g., for five days). Alternatively, access to content 531 may be limited to a pre-set number of times (e.g., access to content 531 is limited to three times only). Authentication server 730 may also compare a media device identification (e.g., 640) with a list of authorized media access devices registered with user account 532 to determine if access to content 531 is permitted. In embodiments of the present invention, authentication server 730 compares the current time and/or date with the time and/or date of request 721 to determine is access to content 531 is permitted. If access to content 531 is not permitted (e.g., in accordance with access rights field 620), authentication server 730 may not generate a content key 523 to user device 710. As described above, in embodiments of the present invention, access to a particular instance of content 531 may be limited to one content access device at a time.

In embodiments of the present invention, if user access to content 531 is permitted, authentication server 730 generates a message (e.g., 722) which authorizes the user device 710 to access the instance of content 531. In embodiments of the present invention, message 722 may comprise a content key (e.g., 523) which is stored locally on user device 710. In embodiments of the present invention content key 523 may be encrypted and hidden on user device 710 to prevent unauthorized access. As described above, content key 523 may comprise content identification field 610, access rights field 620, ownership identification field 630 and/or media device identification field 640. While the present embodiment recites these fields specifically, it is noted that additional data fields may be included within content key 523 such as a key identifying the authentication server (e.g., 730) which generated message 722. In embodiments of the present invention, user device 710 is denied access to decryption keys to content 531 unless it first receives content key 523 from authentication server 730. In embodiments of the present invention, user device 710 compares the current time and/or date with the access rights field 620 to determine whether access to content 531 is permitted. If the current time and/or date are within the parameter(s) of access rights field 620, access to decryption keys for content 531 is permitted. User device 710 may also compare the unique identification embedded within content 531 with content identification field 610 to verify that the correct instance of content is being accessed.

In embodiments of the present invention, if content 531 is not yet resident on user device 710, it may be provided by authentication server 730. In another embodiment, authentication server 730 may verify with content provider 750 that user device 710 is permitted access to content 531. In another embodiment, user device 710 may contact content provider 750 upon receipt of content key 523 from authentication server 730 to initiate receiving content 531.

Embodiments of the present invention advantageously register access rights of an instance of content 531 separately from the media which conveys the content. In the conventional art (e.g., a compact digital (CD) disk or digital versatile disk (DVD)), possession of the media (e.g., the disk itself) implies access rights to the content stored thereon. If the media storing the content is damaged, lost, or stolen, the user's access rights to the content are terminated. In embodiments of the present invention, if the media storing the content is damaged, lost, or stolen, the user can still access the content by accessing their user account information and re-establishing their access rights. Thus, rather than having to buy a new copy of the media, the user can simply verify that they had previously purchased access rights to content 531 and access it without having to purchase it again.

For example, in embodiments of the present invention, if mass storage device 530 of user device 710 suffers a catastrophic breakdown and all of the content stored thereon is lost, the user can buy a new mass storage device. Then, rather than having to purchase new copies of the content 531, the user can access their user account 532 to verify that they have access rights to content 531. Authentication server 730 can then either send a copy of content 531 (e.g., a locally stored copy), or verify with content provider 750 that the user is permitted to access the content. The user can then access a copy of content 531 for storage on their new mass storage device.

Additionally, a user can access their content 531 from multiple locations without necessitating physical possession of the media conveying the content. For example, a user can have a copy of content 531 stored on their personal computer (e.g., system 500). However, if the user is traveling and wants to access content 531 using a mobile device (e.g., user device 710) they can access authentication server 730 with user device 710, verify their access rights, and download a copy of content 531 onto user device 710. In embodiments of the present invention, the copy of content 531 stored on the mobile device is considered to be an exact copy of the content stored on the user's personal computer. Thus, the unique identification stored in content identification field 610, as well as the access rights field 620, of both copies may be identical.

In embodiments of the present invention, a user can transfer their access rights to another user in a manner similar to selling a CD to another user. For example, the user can simply access their user account 532 on authentication server 730 and indicate that the access rights for content 531 are to be transferred to the user account of the person purchasing the content. In embodiments of the present invention, authentication server 730 may be utilized to transfer credits from one user's account to another user's account, or to an account of content provider 750, to facilitate a purchase of content. Additionally, if a user is simply renting content 531, they could pay an additional fee to change their access rights from a rental to outright ownership of that instance of content. As a result, the access rights field 620 of content key 523 can be updated to reflect the new access parameters for that user.

FIG. 8 is a flowchart of a process 800 for accessing content in accordance with embodiments of the present invention. In step 810 of FIG. 8, a request to access an instance of content is received. As described above with reference to FIG. 7, in order to access an instance of content 531, access to the decryption key 523 for that instance of content 531 in necessary. In embodiments of the present invention, unless user device 710 has a valid content key 523 for that instance of content 531 stored thereon, access to the decryption key is blocked. The user can receive a copy of the content key 523 when, for example, an instance of the content 531 is downloaded from the Internet, a pre-loaded mass storage device attempts to access content stored thereon, or when a user device 710 (e.g., a CR-ROM player) attempts to access the content. As described above with reference to FIG. 7, if the content key 523 is not stored upon the user device 710, a request 721 s generated by the user device 710 for permission to access the instance of content 531.

In step 820 of FIG. 8, a user account which identifies an authorized user of the instance of content and a parameter for accessing the instance of content is accessed. In embodiments of the present invention, an authentication server 730 maintains a database of user accounts 532 which assign user access rights to an instance of content 531. In embodiments of the present invention, the instance of content 531 is identified by an identification unique to that instance of content 531 which is embedded within the content (e.g., watermarked into the content). Using this unique identification, authentication server 730 determines whether a particular user has access rights to that instance of content 531.

In step 830 of FIG. 8, a determination is made that accessing the instance of content is within the parameter. In embodiments of the present invention, access rights parameters may be assigned to a user's account 532. For example, a user who has rented an instance of content 531 has limited access rights which may be terminated when a pre-defined time period has expired, or the content 531 has been accessed a set number of times by that user.

In step 840 of FIG. 8, access to the instance of content is authorized. If the access rights parameter has not been exceeded, permission is conveyed to the user of the content access device.

Accordingly, embodiments of the present invention advantageously prevent extraction of locally stored content back off the mass storage device. Unless the media device accessing content 531 has a valid copy of content key 523, access to content 531 is blocked. Furthermore, unless access rights for a user are verified with, for example, authentication server 730, the user cannot receive a copy of the content to their media device Embodiments of the present invention advantageously balance user convenience and the economic interests of content creators and/or distributors. Embodiments of the present invention thus advantageously facilitate convenient and secure distribution of proprietary content.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for accessing content, said method comprising:
receiving a request to access an instance of content by a requesting user from a media device, wherein said instance of content comprises: digital content; and an embedded content key comprising first values of a plurality of fields, wherein said plurality of fields comprise: a unique identifier of said instance of content; access rights associated with said instance of content; and ownership associated with said instance of content;
responsive to said request, accessing a user account based on said unique identifier, wherein said user account is associated with a registered user and comprises a user content key, wherein said user content key comprises second values of said plurality of fields;
verifying said requesting user's rights to access said instance of content by comparing said first values and said second values; and
upon a determination that said requesting user is authorized to access said instance of content, transmitting a message to said media device for enabling said requesting user to access said instance of content.

2. The method as recited in claim 1 further comprising:
storing said user account in said media device.

3. The method as recited in claim 1 further comprising:
registering said media device in said user account, wherein said media device is associated with said registered user.

4. The method as recited in claim 1 further comprising:
storing said message locally on said media device as a hidden file.

5. The method as recited in claim 1 further comprising:
conveying a corresponding unique identifier via said message, wherein said corresponding unique identifier is associated with said instance of content.

6. The method as recited in claim 5, wherein said verifying comprises:
comparing said unique identifier embedded within said instance of content with said corresponding unique identifier conveyed in said user content key;
determining that current time and date consistent with values of access rights in said user content key; and
allowing access to a decryption key for said instance of content in response to a match resulting from said comparing and further in response to a determination of a compliance resulting from said determination.

7. The method as recited in claim 1 further comprising:
storing said user account in a remote registry server.

8. A system for authorizing access to content, said system comprising:
an access device configured to store an instance of content, wherein said instance of content comprises digital content and an embedded content key comprising first values of a plurality of fields, wherein said plurality of fields comprise: a unique identifier of said instance of content; access rights associated with said instance of content; and ownership associated with said instance of content, wherein said access device is further configured to generate a request to access said instance of content, and wherein said request comprises said unique identifier;
an authorizing device coupled to said access device, wherein said authorizing device is configured to access a user account associated with a registered user based on said unique identifier, wherein said user account comprises a user content key, wherein said user content key comprises second values of said plurality of fields, and wherein said authorizing device is operable to: verify said requesting user's rights to access said instance of content by comparing said first values and said second values; and upon a determination that said requesting user is authorized to access said instance of content; transmit a message to said media device for enabling said requesting user to access said instance of content.

9. The system of claim 8, wherein said message comprises said user content key.

10. The system of claim 9, wherein said plurality of field further comprises an access device identification.

11. The system of claim 8 wherein said message is stored locally in a hidden location of said access device in a protected format.

12. The system of claim 8 wherein said access device is configured to compare current time and date information with time and date information indicated in said user content key.

13. The system of claim 8 wherein said authorizing device comprises a remote registry server.

14. A system for authorizing access to content comprising:
a mass storage device configured to store one or more user accounts; and
a processing unit configured to transmit an instance of content, wherein said instance of content comprises: digital content; and an embedded content key comprising first values of a plurality of fields, wherein said plurality of fields comprise: a unique identifier of said instance of content; access rights associated with said instance of content; and ownership associated with said instance of content, wherein said processing unit is further configured to:
receive a request to access said instance of content by a requesting user from a media device;
responsive to said request, access a user account based on said unique identifier from said mass storage device based on said unique identifier, wherein said user account is associated with a registered user and comprises a user content key, wherein said user content key comprises second values of said plurality of fields;
verify said requesting user's access rights to said instance of content by comprising said first values and said second values; and
upon a determination that said requesting user is authorized to access said instance of content, transmit a message to said media device for enabling said requesting user to access said instance of content.

15. The system of claim 14 wherein said message comprises said user content key.

16. The system of claim 15 wherein said message comprises an encrypted key and wherein said encrypted key is hidden on said media device.

17. The system of claim 14, wherein said plurality of field further comprises an identification of a media device associated with said instance of content.

18. The system of claim 14 wherein said processing unit is configured to compares current time and date with values of access rights in said user content key.

19. The system of claim 14 wherein said processing unit is further configured to verify an identity of a user accessing said instance of content.

20. A registry for determining access to content, said registry comprising:

a memory component configured to store user accounts, wherein each user account is associated with a user, and wherein each user account comprises a respective user content key associated with an instance of content that said user is authorized to access, and wherein said respective user content key comprises a plurality of fields, said plurality of fields comprising: a unique identifier of said instance of content; access rights of said user associated with said instance of content; ownership associated with said instance of content; identification of an access device that is associated with said user and said instance of content.

21. A registry as described in claim 20 wherein parameters of said access rights indicate a number of times said user is allowed to access said instance of content.

22. A registry as described in claim 20 wherein parameters of said ownership indicate whether said instance of content is owned or rented by said user.

23. A registry as described in claim 22 wherein said parameters of said ownership is operable to indicate whether said instance of content is transferable between users.

24. A registry as described in claim 20 wherein said user accounts are stored within a registry server, and wherein said registry server is operable to communicate with the Internet.

25. A registry as described in claim 24 wherein a copy of a user account associated with said user is stored within a local user device on which said user accesses said instance of content and wherein said local user device is operable to communicate with said registry server to obtain said user account stored therein.

26. A registry as described in claim 20 wherein said user accounts are stored within a local user device on which said user accesses said instance of content.

27. A registry as described in claim 20 wherein said user content key is operable for extending a rental of said instance of content.

* * * * *